United States Patent Office 2,818,489
Patented Dec. 31, 1957

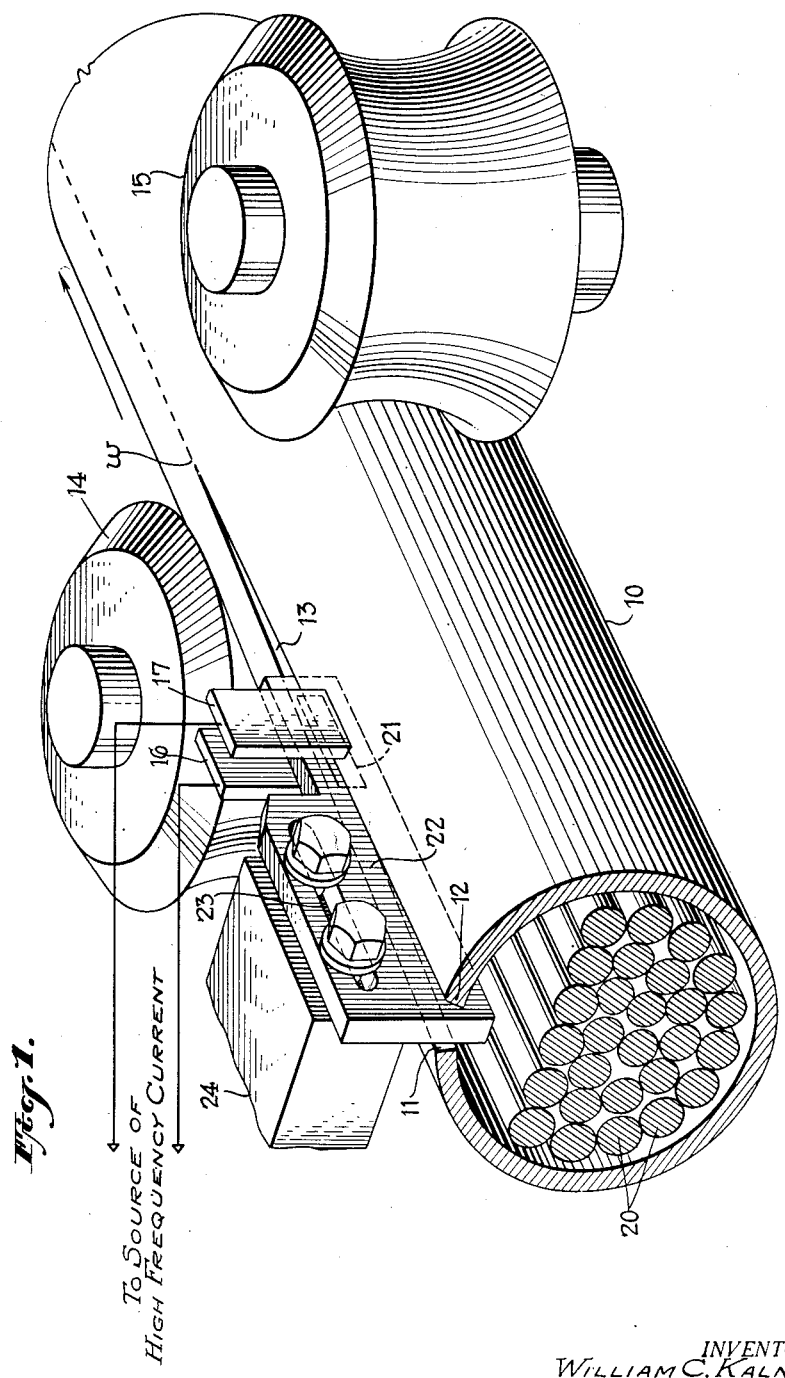

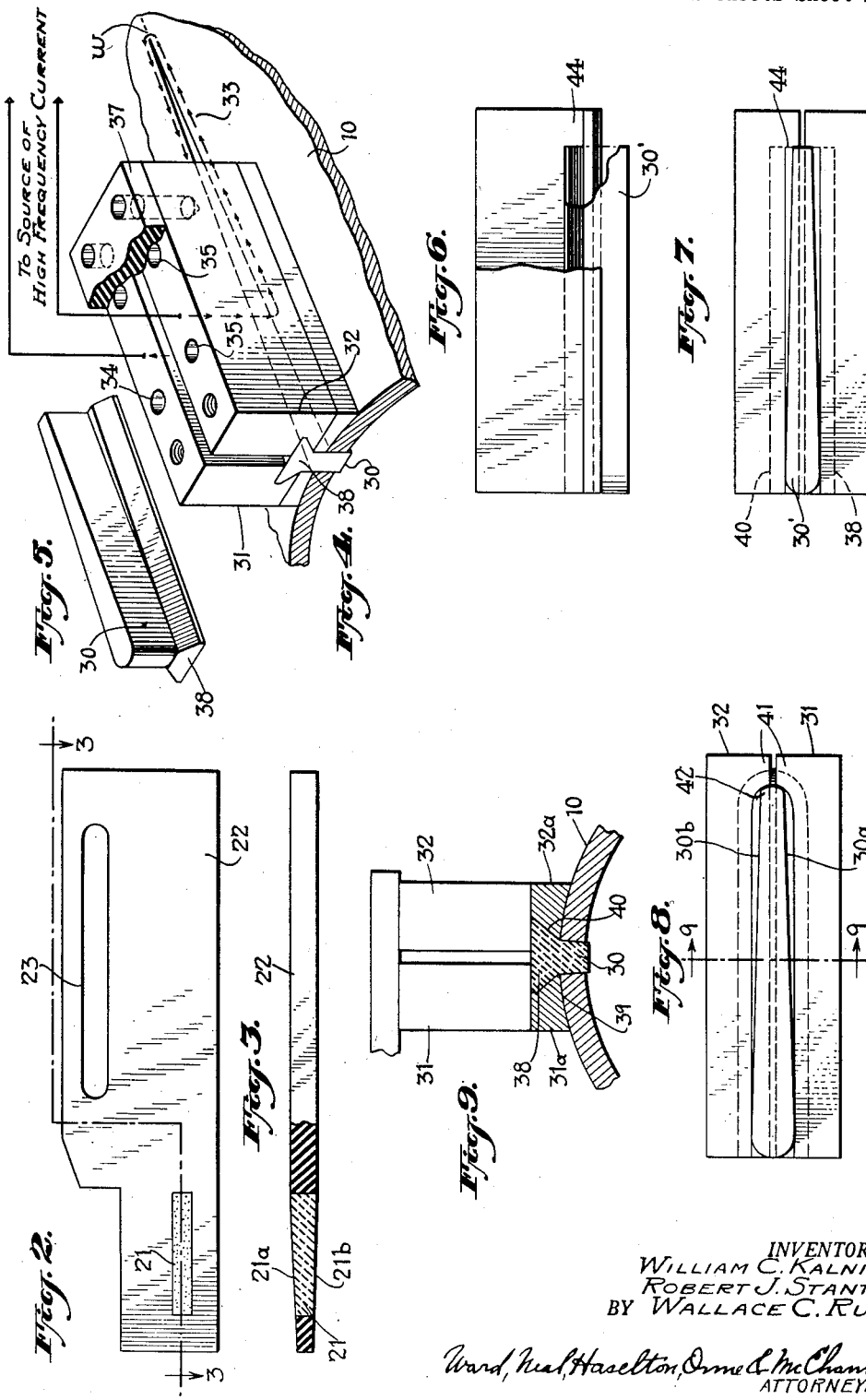

2,818,489

TUBE WELDING BY HIGH FREQUENCY RESISTANCE HEATING

William C. Kalning, Metedeconk, N. J., and Robert J. Stanton, Brooklyn, and Wallace C. Rudd, Larchmont, N. Y., assignors to Magnetic Heating Corp., New Rochelle, N. Y., a corporation of New York Application January 9, 1956, Serial No. 558,060

7 Claims. (Cl. 219—59)

This invention relates to methods and apparatus for welding by the use of high frequency electrical heating and more particularly among other possible uses for continuously welding a longitudinal seam in metal tubing, although features of the invention are also adaptable for the welding together of the opposed edges of two continuous strips.

Reference is made to the co-pending application of Wallace C. Rudd and Robert J. Stanton, Serial No. 421,768, filed April 8, 1954, and to their preceding application Serial No. 332,422, filed January 21, 1953 (now abandoned), the subject matter of said applications being disclosed also in Belgian Patent No. 530,877, granted August 31, 1954. Said applications and said patent disclose a method and means for welding together the edges defining the longitudinal gap in metal tubing as the tubing is advanced longitudinally while applying pressure thereto to close said gap at a weld point. According to said method, the heating of the gap edges is effected by the use of electrodes connected to an oscillatory current source and applied respectively adjacent the gap edges at points positioned shortly in advance of the welding point, the current being of a frequency sufficiently high so that the lowest impedance path between the electrodes follows said gap edges to and from the weld point. The present invention involves improvements upon the features of such method and apparatus.

One of the problems with such method and apparatus is to provide means for accurately holding the approaching gap edges in the metal tubing with the proper spacing in advance of the weld point and to provide means for so doing which will be adequately wear-resistant to withstand the severe frictional conditions when long lengths of the tubing are very rapidly advanced through the machine and which will also have the necessary insulating qualities to insure that the gap edges will be insulated one from the other in the presence of the high frequency high voltage current used to heat the gap edges. At or adjacent the region of the weld point, rollers are generally mounted at each side of the tube for applying the heavy pressure necessary to bring the heated gap edges into firmly welded relation and this pressure is such that any means used in advance of the weld point as a "spreader" to space the gap edges, will also be subject to substantial pressure in sliding frictional contact with such edges. Also the edges may have sharp corners or burrs which would tend rapidly to cut or wear away the usual forms of insulating material if used as a spreader. And if the spreader wears and varies in width sufficiently to allow even relatively small variations in the width of the gap in advance of the weld point, then the position of the desired hottest point (that is, the weld point) as well as the temperature thereof, may vary, resulting in irregular welding. Slight variations in the gap width may have an important effect upon the impedance path for the high frequency current flowing from the electrodes along the gap edges to and from the weld point.

In accordance with the present invention, it has been found that the above-noted difficulties may be satisfactorily overcome by providing spreader means composed of a suitable hard ceramic insulating material located in the gap in the metal tubing in slidable engagement with the gap edges and at or adjacent the region of the electrodes which apply the high frequency current to such edges. In accordance with one embodiment of the invention, such ceramic spreader may take the form of an insert adjustably carried in supporting means formed for example of a synthetic resinous material; and according to another embodiment of the invention, a spreader is used in the form of a ceramic insert carried in or upon the electrodes themselves.

Various further and more specific objects, features and advantages of the invention will appear from the description given below taken in connection with the accompanying drawings, illustrating by way of example certain preferred forms of the invention.

In the drawings:

Fig. 1 is a somewhat schematic perspective view of one embodiment of the invention;

Fig. 2 is a side elevational view of the spreader element of the same embodiment;

Fig. 3 is a view partly in section taken along the line 3—3 of Fig. 2;

Fig. 4 is a perspective view with parts broken away showing an alternative embodiment of the invention;

Fig. 5 is a perspective view of the ceramic spreader element of the arrangement of Fig. 4, this view showing such element in inverted position;

Fig. 6 is a side view partly broken away of a spreader and contact elements of an arrangement similar to that of Fig. 4;

Fig. 7 is a bottom view of the parts shown in Fig. 6;

Fig. 8 is a bottom view of a slightly different construction; and

Fig. 9 is a vertical sectional view taken substantially along line 9—9 of Fig. 8.

Referring now to the drawings in further detail, and particularly Fig. 1, there is here shown a tube 10 being advanced in the direction indicated by the arrow, through a tube mill and past a weld point indicated at w, where the edges 11 and 12 of a longitudinal V-shaped gap 13 in the tube are brought together and welded. The gap is caused to be firmly closed at or adjacent the weld point w by a pair of rollers as at 14, 15 located at opposite sides of the tube and applying the necessary pressure to the tubing for that purpose.

A pair of contacts is illustrated at 16, 17 which are connected respectively to the terminals of a source of radio frequency current as indicated, whereby as is explained in the above-mentioned co-pending applications, heating current is caused to flow from such electrodes or contacts along the edges of the V-shaped gap 13 to and from the weld point w.

If desired, portions of the space within the tubing as it advances past the contacts may contain rods of ferromagnetic core material as indicated at 20, the purposes of which are explained in the above-mentioned applications.

With the embodiment of the invention as shown in Fig. 1, the "spreader" means in the gap 13 may comprise an insert 21 of suitable hard tough ceramic material having high insulating characteristics and mounted in an insulation support as at 22, such support being preferably adjustable in position longitudinally of the path of travel of the tubing as by a bolt and slot connection as indicated at 23 with respect to a suitable stationary support 24.

As more clearly shown in Fig. 2, the ceramic insert 21 may be formed of a generally rectangular shape and fitted into a correspondingly shaped aperture in the support 22, However, as shown in cross-section in Fig. 3, this insert preferably has its sides as at 21a and 21b slightly tapered toward each other, this taper corresponding to the desired angle between the gap edges in the V-shaped gap in the tubing in advance of the weld point w. Such ceramic insert may be made for example of a fired lava material, one well known form of which is commercially available under the trade name "Diamonite" (a product of U. S. Quarry Company of Canton, Ohio).

The support 22 may be formed for example of a suitable laminated synthetic thermoset resinous material, or such a material formed in admixture with mica or the like. One well known example of such material is commercially available under the trade name of "Micarta" as put out by the Bakelite Company.

With the forms of the invention shown in Figs. 5–9 inclusive, a spreader in the form of an insert 30 made of ceramic material such as above referred to, is provided in conjunction with the high frequency current electrodes 31, 32. Such electrodes, as will be understood, are suitably supported and connected to a high frequency source of current as indicated in Fig. 4, so as to provide a heating current path extending between same and to and from the weld point w along the gap edges as indicated by the small arrows 33. These contacts may be water-cooled by providing same with cooling fluid cavities as indicated at 34, 35 (as may also be the case with the contacts 16 and 17 in Fig. 1). Thus the cooling fluid will not only serve to keep the contacts at a safe low temperature to avoid fusion thereof, but at the same time such cooling will tend also to keep the spreader member 30 from excessive heating and any consequent danger of expansion and possible cracking of the parts. The contacts may be bolted to any suitable insulated supporting structure as indicated at 37.

As further indicated in the various views of Figs. 5–9, ceramic inserts as at 30, 30' may have a dovetailed joint type of connection as indicated at 38 with respect to the contacts 31, 32. That is, as best shown in Fig. 9, the contact assemblies may be recessed as at 39, 40 slidably to receive correspondingly shaped portions on the ceramic insert 30, so as to retain the latter with its depending portions protruding down into the longitudinal gap in the tubing 10. At the forward ends of the contacts 31, 32, the recessed portions 39, 40 are discontinued so that, as shown in Fig. 8, the lower forward depending edges of the contacts as at 41 may provide stop means preventing the forward end 42 of the spreader from being slid along with the tubing toward the weld point. As will further appear from Figs. 7 and 8, the depending side portions as at 30a and 30b on the members 30, 30' are formed at slight angles with respect to the path of travel of the tubing, that is, the same angles relative to each other as are the edges of the desired V-shaped gap in the tubing.

As also appears in Figs. 4 and 9, the lower contacting surfaces of the electrodes 31, 32 may be formed separately as strips of suitable wear-resistant metal as indicated at 31a and 32a, such strips being affixed in any suitable known way to the main bodies of the contacts 31, 32. In the form shown in Figs. 6 and 7, such strips are omitted. Also in the latter figures the inner end of the insert 30' is made rectangular as at 44 instead of being rounded as in Figs. 8 and 9.

As to the construction and operation of the arrangements of the invention insofar as not herein specifically described, reference may be had to the above-mentioned co-pending applications. When the invention is used for welding the edges of strips together, the strips may be advanced in the ways disclosed in the co-pending application of Wallace C. Rudd, entitled, "Continuous Welding of Strips and the Like," filed December 7, 1955, Serial No. 551,566, reference to which is hereby made. The spreader may be constructed and arranged to cooperate with the gap between the strips in the same manner as with the gap and tubing.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for welding together a pair of approaching metal edges which are being longitudinally advanced, comprising: means for bringing said edges together at a welding point with a narrow V-shaped gap formation therebetween in advance of said point; a pair of contacts mounted respectively to be engaged by said edges along opposite sides of the gap at a position shortly in advance of said point; means for connecting the terminals of a source of radio frequency heating current respectively to said contacts whereby such current will flow along the gap edges from the contacts to and from the weld point; means for retaining said V-shaped formation with a constant width, comprising a spreader element of ceramic material, the side surfaces of which respectively are slidably engaged by the edges of the metal within said gap; and means for mounting and retaining said element stationary at a predetermined position in advance of said welding point.

2. Apparatus in accordance with the foregoing claim 1 and in which said element is retained in said gap adjacent said contacts and said retaining means comprises an insulation member embodying thermoplastic material and mounted in said gap.

3. Apparatus in accordance with the foregoing claim 1 and in which said element is mounted on and between portions of said contacts to extend down into the gap.

4. Apparatus in accordance with the foregoing claim 1 and in which said ceramic element is formed of a fired lava material.

5. Apparatus in accordance with the foregoing claim 3 and in which said element and said contacts are interconnected by a dovetail joint formation.

6. Apparatus in accordance with the foregoing claim 3 and in which the contacts are provided with fluid cooling means, thereby also causing cooling of said element as mounted thereon.

7. Apparatus for welding together the edges of a longitudinal gap in metal tubing, which comprises: means for longitudinally advancing the tubing while subjecting the same to pressure at opposite sides of the gap to bring such edges together at a welding point in a narrow V-shaped formation; a pair of contacts mounted respectively to be engaged by surfaces of the metal of the tubing along opposite sides of the gap at a position shortly in advance of said point; means for connecting the two terminals of a source of radio frequency heating current respectively to said contacts whereby such current will flow along the gap edges from the contacts to and from the weld point; means for retaining said gap edges with such V-shaped formation of constant width, comprising a spreader element of ceramic material the side surfaces of which respectively are slidably engaged by the edges of the metal of the tube within said gap; and means for mounting and retaining said element at a predetermined position in advance of said welding point and adjacent said contacts.

References Cited in the file of this patent

UNITED STATES PATENTS

| | | |
|---|---|---|
| 1,864,139 | Mark | June 21, 1932 |
| 2,139,211 | Sessions | Dec. 6, 1938 |
| 2,687,464 | Crawford | Aug. 24, 1954 |